Figure 1:
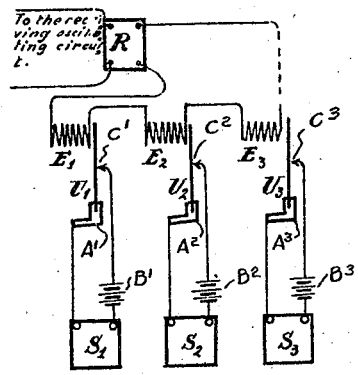

March 20, 1928.

E. FIAMMA

RADIO TELEMECHANIC SYSTEM

Filed July 1, 1924

INVENTOR:
ERMANNO FIAMMA
BY: Francis E. Boyce
ATTORNEY

Patented Mar. 20, 1928.

1,663,073

UNITED STATES PATENT OFFICE.

ERMANNO FIAMMA, OF AQUILA, ITALY.

RADIO TELEMECHANIC SYSTEM.

Application filed July 1, 1924, Serial No. 723,490, and in Italy June 14, 1923.

In the practice of wireless signalling by electromagnetic waves the possibility of obtaining a selective signalling utilizing the characteristic of vibrating devices (tuning forks, etc.) to respond only to a fixed and well determined frequency of oscillation is well known. That is if a set of said vibrating devices is submitted to mechanical or electromagnetical periodic impulses, only that device whose period of vibration is equal to the period of the impulses will enter into full vibration.

The utilization of that characteristic is obtained in practice with a transmitting station equipped with means for producing electromagnetic wave trains having a determined frequency for each signal, and a receiving station equipped with a number of vibrating devices equal to the number of signals to be received, each one of which vibrating devices is tuned to enter into full vibration when subjected to periodic impulses of a frequency equal to the frequency of the wave trains of the corresponding signal.

For accomplishing said objects in the present invention are utilized as vibrating devices a number of metallic strips fixed at one end and free at the other.

It is well known that, by constructing each strip of a determined length, cross section and weight the fixed period of oscillation with which the same strip may vibrate can be easily determined.

These strips, as described further on, are utilized for transmitting wave trains of a definite frequency and for selectively responding in the receiving station to a determined frequency of wave trains.

Figure 2:
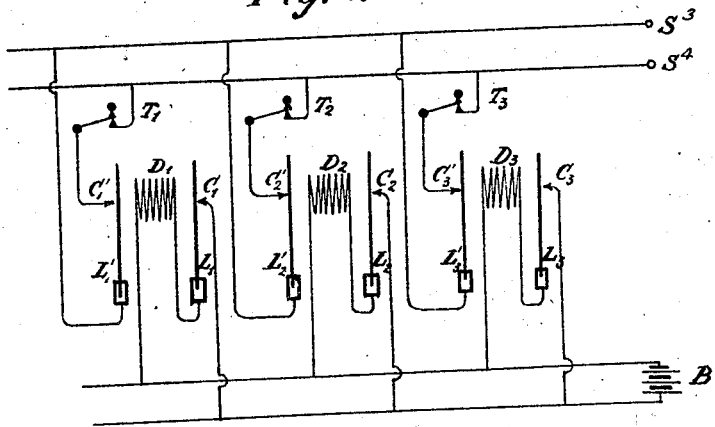

In the drawings accompanying and forming part of this specification,

Figs. 1 and 2 are diagrammatic illustrations of a receiving station and a transmitting station, respectively, embodying the features of the present invention.

The receiving station illustrated in Fig. 1 is provided with a selecting apparatus comprising a plurality of flexible metallic strips $U^1$, $U^2$, $U^3$ (only three being shown in the drawings). One end of each strip is confined in a fixed member, $A^1$, $A^2$, $A^3$ respectively. Each of said strips is formed of magnetic metal and is intended to have a period of oscillation which is different from that of any other strip of the series. For vibrating the strips, electromagnets $E^1$, $E^2$ and $E^3$, one for each strip, are provided, or the fixed members of the strips may be mechanically connected and a single electromagnet can influence the whole set. These electromagnets may be inserted either in series or in parallel in the exit circuit of an ordinary detector or amplifier provided with ionic valves R. Each of the strips is disposed so as to cause by its vibrations the opening and closing of a corresponding contact, $C^1$, $C^2$, $C^3$, respectively, which contact is in circuit with a battery, $B^1$, $B^2$, $B^3$, respectively. In each of said circuits is included the electric or mechanical device acting when the corresponding signal $S_1$ $S_2$ $S_3$ is respectively received.

The transmitting apparatus illustrated diagrammatically in Fig. 2 also comprises a plurality of strips or tongues $L^1$, $L^2$, and $L^3$, mounted in a manner similar to those of the receiving station. The strips of the receiving station will correspond in number with those of the transmitting apparatus, and any number of these strips may be employed according to the number of different signals which it may be desired to transmit. By means of this arrangement a wide range of selection is obtained. Each strip of the transmitting apparatus is caused to vibrate by means of a corresponding electromagnet, $D^1$, $D^2$ and $D^3$, respectively, said electromagnets being in circuit through individual contacts $C^1$, $C^2$ and $C^3$ with a battery or other source of current B. The dimensions and weight of the successive strips $L^1$, $L^2$ and $L^3$ are so graduated that each strip will vibrate at a determined frequency which is different from those of the other strips. The transmitting apparatus is provided with a second series of strips $L'_1$, $L'_2$ and $L'_3$, which may be called transmitters, while the first series of strips of the transmitting apparatus may be termed exciters. Each strip of the second series is graduated to vibrate at the same frequency as its corresponding strip of the first series, and is disposed opposite to the electromagnet which operates said corresponding strip, whereby the respective transmitters are tuned to the same frequency as their corresponding exciters. Consequently, when the strips $L^1$, $L^2$, $L^3$ are operating, the pulsating flux of the corresponding electromagnets will cause the vibration of the strips $L'_1$, $L'_2$, $L'_3$, which in turn will alternately open and close a circuit at $C'_1$, $C'_2$ and $C'_3$, respectively, said circuits also including manually operable switches $T^1$, $T^2$, $T^3$, respectively, connected in parallel to the terminals $S^3$ and $S^4$ of the antenna-earth circuit of the transmitting station.

It is to be understood that the transmitting device is capable of radiating a series of trains of electromagnetic waves separated by equal intervals, the number of wave trains emitted in a second being subject to change at the will of the operator. Assuming that the number of wave trains emitted in a second by the respective devices at the transmitting station are $n^1$, $n^2$ and $n^3$, respectively, the operation of the switch $T^1$ will cause the antenna-earth circuit, represented in the drawings by the terminals $S^3$, $S^4$, to be closed $n'_1$ times in a second by the strip $L'_1$, and there will be an emission of small $n'_1$ wave trains in a unit of time. By closing the switch $T^2$ there will be a corresponding emission of small $n'_2$ wave trains per second, and so on. It will thus be seen that by graduating the different strips so that the frequency of vibration of each couple (comprising exciter and transmitter) of the transmitting device is equal to the frequency of vibration of the corresponding strips of the receiving device, the latter strips will be vibrated in response to the operation of the respective switches $T^1$, $T^2$ and $T^3$ of the transmitting device, and consequently a connection will be established between the terminals $S_1$, $S_2$, $S_3$ to operate any device connected therewith.

From the foregoing, it will be obvious that the flux generated by each electromagnet will pulsate at its individual frequency, and consequently only that particular strip of the receiving station which is tuned to that of a particular strip of the transmitting device, will oscillate, and therefore only the apparatus operated by that particular strip of the receiving station will function during that period of time. For instance, should the wave trains during a second radiating from the transmitting station be $n^2$, the current flowing through the electromagnets of the receiving station will pulsate at the frequency $n^2$, the magnetic flux will do the same, and the strip $U^2$ of the corresponding period only will vibrate, thus causing the apparatus associated with the terminal member $S^2$ to function.

It will be evident that in order to ensure the functioning of the different selectors, it must be possible to radiate from the transmitting station a series of wave trains the duration of which can be regulated at the will of the operator, and that the number of wave trains per second should also be subject to variations at the will of the operator, but must be kept strictly constant during the required time.

It may be stated that the purpose of providing two series of strips in the transmitting device is to avoid the necessity of connecting the circuit of the so-called exciting strips, which is traversed by a current of low frequency and tension, to the circuit of the transmitting strips, which may be traversed by a current of high tension and frequency. The set of vibratory strips of the transmitting device may be inserted by means of the terminals $S^3$, $S^4$ in place of the key or the microphone of a continuous wave radio transmitting station of any type, or in the primary circuit of a spark station, either alone or coupled to relays or electromagnetic amplifiers, for the purpose of interrupting or modulating the emissions of continuous waves or producing the emissions of wave trains having a given frequency, which may be chosen at will within the limits of the receiving strips.

Having thus described my invention, what I claim is:

In a radiotelemechanical system a transmitting station equipped with a number of modulators equal to the number of orders to be transmitted, consisting each of a group of two bands of reeds of magnetic metal, secured at one end and free at the other, tuned by construction to a determined frequency of vibration equal for the two bands of the same modulator, but different for each modulator, and kept vibrating by an electromagnet whose circuit is periodically interrupted by a contact made by one of the bands in its vibration, while the other band makes a similar contact which can be inserted at will of the operator in the circuits of the transmitting station, so as to cause the emission of a wave train for each vibration of the band, and a receiving station equipped with a selector consisting in an electromagnet whose armature is connected to a number of metallic reeds equal to the number of signals to be received secured at one end and free at the other, and tuned each to a frequency of vibration equal to the frequency of the corresponding transmitting modulator, the electromagnet being connected to the radio receiver conveniently tuned, and each of the receiving reeds, when in vibration closing a contact causing the electromechanical execution of the corresponding order.

In testimony whereof I have hereunto signed my name.

ERMANNO FIAMMA.